(12) United States Patent
Jin et al.

(10) Patent No.: US 9,490,708 B2
(45) Date of Patent: Nov. 8, 2016

(54) MULTIPLE-OUTPUT DC/DC CONVERTER AND POWER SUPPLY HAVING THE SAME

(71) Applicant: LG INNOTEK CO., LTD., Seoul (KR)

(72) Inventors: Chunfeng Jin, Seoul (KR); Dong Young Huh, Seoul (KR); Jae Sam Lee, Seoul (KR); Hyun Woo Lee, Seoul (KR); Jung Hwan Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/570,379

(22) Filed: Dec. 15, 2014

(65) Prior Publication Data

US 2015/0171757 A1   Jun. 18, 2015

(30) Foreign Application Priority Data

Dec. 13, 2013   (KR) .................. 10-2013-0155591

(51) Int. Cl.
*H02M 3/335* (2006.01)
*H02M 3/28* (2006.01)
*H02M 1/34* (2007.01)

(52) U.S. Cl.
CPC ......... *H02M 3/33507* (2013.01); *H02M 3/285* (2013.01); *H02M 3/33546* (2013.01); *H02M 3/33553* (2013.01); *H02M 2001/342* (2013.01); *Y02B 70/1491* (2013.01)

(58) Field of Classification Search
CPC ............... H02M 3/33546; H02M 3/33553; H02M 3/33507
USPC ........... 363/46, 41, 15–17, 20, 21.04, 21.01, 363/21.12, 21.14, 21.18, 71, 67, 69, 98, 95, 363/97, 84, 89, 131, 132
See application file for complete search history.

(56) References Cited

U.S. PATENT DOCUMENTS

| | | | | |
|---|---|---|---|---|
| 4,992,702 A | * | 2/1991 | Shimizu et al. | 315/219 |
| 5,227,964 A | * | 7/1993 | Furuhata | 363/56.1 |
| 5,408,401 A | * | 4/1995 | Miyazaki | 363/21.08 |

(Continued)

FOREIGN PATENT DOCUMENTS

| | | |
|---|---|---|
| JP | 358-003787 U | 1/1983 |
| JP | 63-302759 A | 12/1988 |

(Continued)

OTHER PUBLICATIONS

European Search Report dated Jul. 6, 2015 issued in Application No. 14197345.3.

(Continued)

*Primary Examiner* — Adolf Berhane
*Assistant Examiner* — Nusrat Quddus
(74) *Attorney, Agent, or Firm* — KED & Associates LLP (57) ABSTRACT

Disclosed are a multiple-output DC/DC converter and a power supply having the same. The multiple-output DC/DC converter includes a converter including a transformer and a first surge absorbing module, wherein the transformer includes a first switch provided to a primary side and outputs a first voltage to a secondary side, and the first surge absorbing module is connected to the primary side of the transformer and absorbs a surge voltage formed at the first switch by a leakage inductance of the transformer; and a first energy converting module to receive output energy supplied from the first surge absorbing module and output a second voltage.

7 Claims, 11 Drawing Sheets

(56) References Cited

U.S. PATENT DOCUMENTS

| | | | |
|---|---|---|---|
| 5,621,623 A * | 4/1997 | Kuriyama et al. | 363/20 |
| 6,005,782 A | 12/1999 | Jain et al. | |
| 8,929,099 B2 * | 1/2015 | Kepley et al. | 363/17 |
| 2004/0085050 A1 | 5/2004 | Jinno | |
| 2013/0322129 A1 | 12/2013 | Yonezawa et al. | |

FOREIGN PATENT DOCUMENTS

| | | |
|---|---|---|
| JP | 404-021186 U | 2/1992 |
| JP | 404-043392 U | 4/1992 |
| WO | WO 2012/111070 A1 | 8/2012 |

OTHER PUBLICATIONS

European Office Action for Application 14 197 345.3 dated Jul. 4, 2016.

S. Abdel-Rahman: "Resonant LLC converter: Operation and Design," Infineon, Sep. 1, 2012, Retrieved from the Internet: URL: http://ww.infineon.com/dgdl/Application_Note_Resonant+LLC+Converter+Operation+and+Design_Infineon.pdf?field=db3a30433a047ba0013a4a60e3be64a1 [retrieved on Jun. 29, 2016].

* cited by examiner

FIG. 1

PRIOR ART

MULTIPLE-OUTPUT DC/DC CONVERTER AND POWER SUPPLY HAVING THE SAME

CROSS-REFERENCE TO RELATED APPLICATION

This application claims priority under 35 U.S.C. §119 to Korean Application No. 10-2013-0155591 filed on Dec. 13, 2013, whose entire disclosure is incorporated herein by reference.

BACKGROUND

1. Field

The embodiment relates to a multiple-output DC/DC converter and a power supply having the same.

2. Background

There is a need to boost a voltage in order to supply energy to an electronic circuit requiring a relatively high voltage, e.g., use a voltage for applications in connection with a power system. It may be also necessary to decrease a voltage from a high voltage to a low voltage according to an electronic circuit. To this end, the study of modeling and analyzing a DC/DC converter as one among various voltage boosting and dropping converters has been performed. The DC/DC converters may be classified into an insulation type and a non-insulation type.

The input and output of the insulation type converter may be insulated by using a transformer having a magnetic core, so that stability is secured. The voltage boosting and dropping ratios of the insulation type converter may be adjusted by adjusting a turn ratio.

The insulation type converters may be classified into a buck type and a buck-boost type. The buck type converter includes a forward converter, a half bridge converter and a full bridge converter. The buck-boost type converter includes a flyback converter. Particularly, since the flyback converter is operated even with only one switching device, the flyback converter may be implemented at a low cost.

Figure 1:
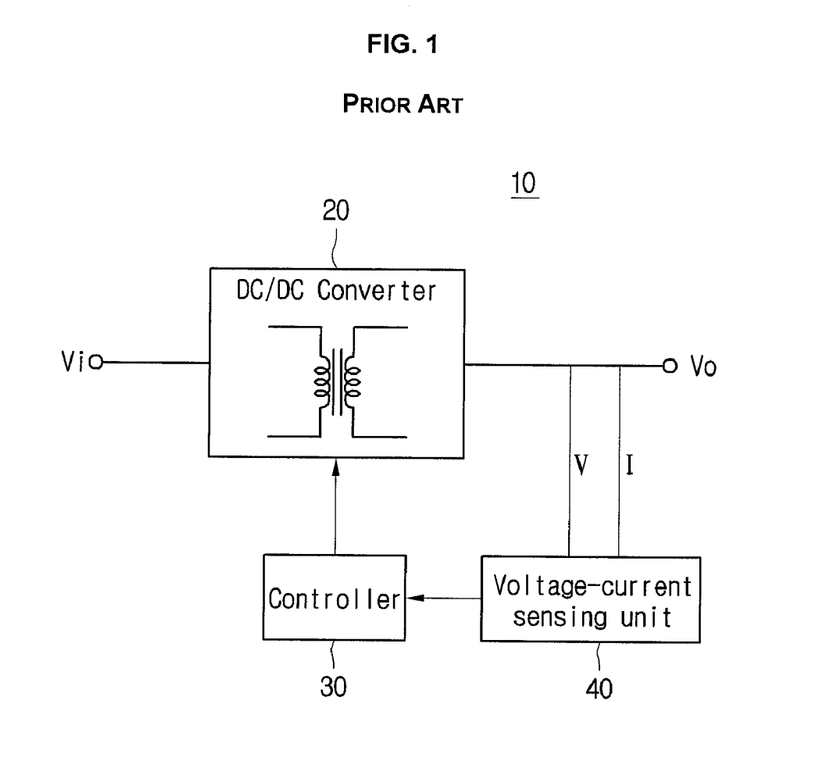
FIG. 1 is a circuit diagram showing a conventional power supply circuit having a DC/DC converter.

FIG. 1 shows a conventional power supply circuit having a DC/DC converter. The DC/DC converter 20 of the power supply circuit 10 may receive the DC power generated by full-rectifying AC power through a rectifier (not shown) as input power Vi. The DC power may be generated by allowing the full-rectified signal to pass through a filter or an additional circuit for improving a power factor.

The DC/DC converter 20 may include at least one switch device and the output voltage of the secondary side of the DC/DC converter 20 may be determined to have a desired value according to a switching scheme of the switch device. A controller 30 controls the on/off operation of the switch to output a desired voltage Vo from secondary side. The controller 30 may include a PWM control unit and a driving unit.

In general, the power supply 10 includes a voltage-current sensing unit 40 which senses a current or voltage of the secondary side or all the current and voltage of the secondary side to feedback the current or voltage or all the current and voltage of the secondary side to the controller, such that the output voltage Vo of the secondary side is controlled. In case of current sensing, since the primary side and the secondary side are insulated from each other, current may be feedbacked using an optocoupler device for transmitting a signal as light.

As one example, a case that a flyback converter serves as the DC/DC converter 20 will be described. While the switch is switched on, the flyback converter stores energy in a magnetizing inductor shown at the primary side of the transformer. When the switch is switched off, the energy of the magnetizing inductor is transferred to the LED load of the secondary side of the transformer.

When the switch of the flyback converter is switched off, due to resonance by leakage inductance, a high-voltage spark may be generated. When the high-voltage spark leads the voltage between both terminals of the switch to rise so that the voltage between both terminals of the switch exceeds a rated voltage, the switch may be destroyed. To solve the problems, the flyback converter includes an RCD snubber circuit to consume the energy accumulated in the leakage inductance, so that the switch peak voltage may be restricted.

Figure 2:
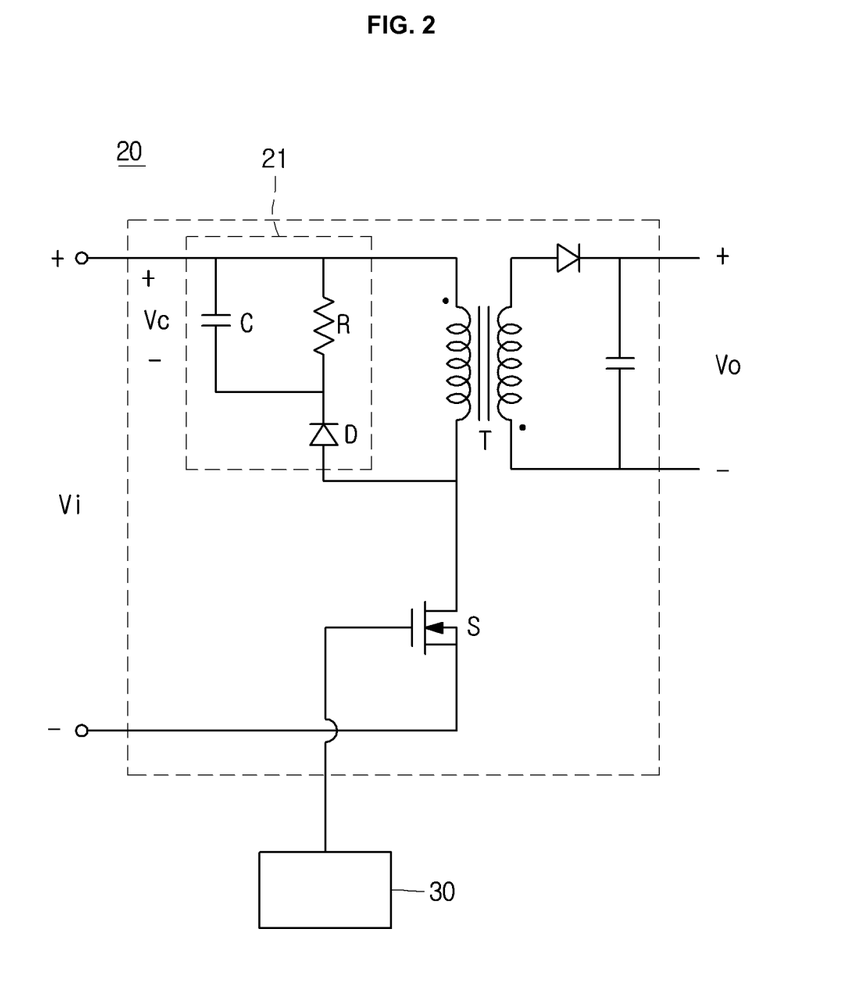
FIG. 2 is a circuit diagram showing a flyback converter.
Figure 3:
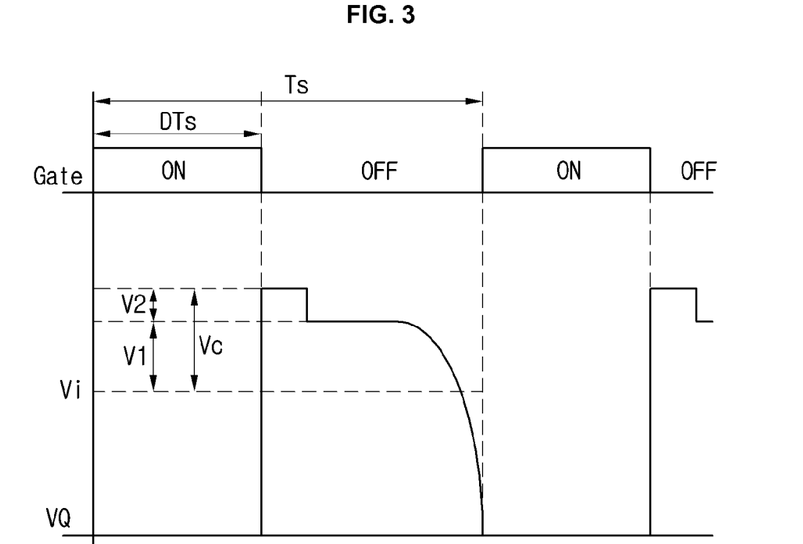
FIG. 3 is a waveform diagram illustrating a voltage between both terminals of the switch according to an on/off operation of the switch of the flyback converter.

FIG. 2 is a circuit diagram showing a flyback converter. FIG. 3 is a waveform diagram illustrating a voltage between both terminals of the switch according to an on/off operation of the switch of the flyback converter.

The flyback converter 20 includes a snubber circuit 21. The RCD snubber circuit 21 for clamping includes a resistor R, a capacitor C and a diode D.

When the switch S of the flyback converter 20 is switched off, the voltage Vc applied to both terminals of the capacitor C of the snubber circuit 21 is equal to the sum of the component V1 generated by the secondary winding and the turn ratio and the component V2 accumulated in the leakage inductance, and the sum of the input voltage Vi and the voltage Vc applied to both terminals of the capacitor C of the snubber circuit 21 is applied to both terminals of the switch Q. Thus, the energy accumulated in the leakage inductance is transferred to the capacitor C of the snubber circuit 21, so that the energy may be consumed by the resistor R.

A surge voltage applied to both terminals of the switch may be restricted through the above-described principle. However, according to the related art, since the energy accumulated in the leakage inductance is consumed by the resistor R in the snubber circuit 21, power conversion efficiency is deteriorated. In addition, since the energy accumulated in the capacitor C of the snubber circuit 21 is consumed in the resistor R, the loss of the resistor R is increased in proportion to a switching frequency of the switch.

Until now, the flyback converter of the buck-boost type having the snubber circuit 21 is mainly described, bur likewise, the above described problems may occur in a forward converter of a buck type.

BRIEF DESCRIPTION OF THE DRAWINGS

The embodiments will be described in detail with reference to the following drawings in which like reference numerals refer to like elements wherein.

DETAILED DESCRIPTION

Figure 4:
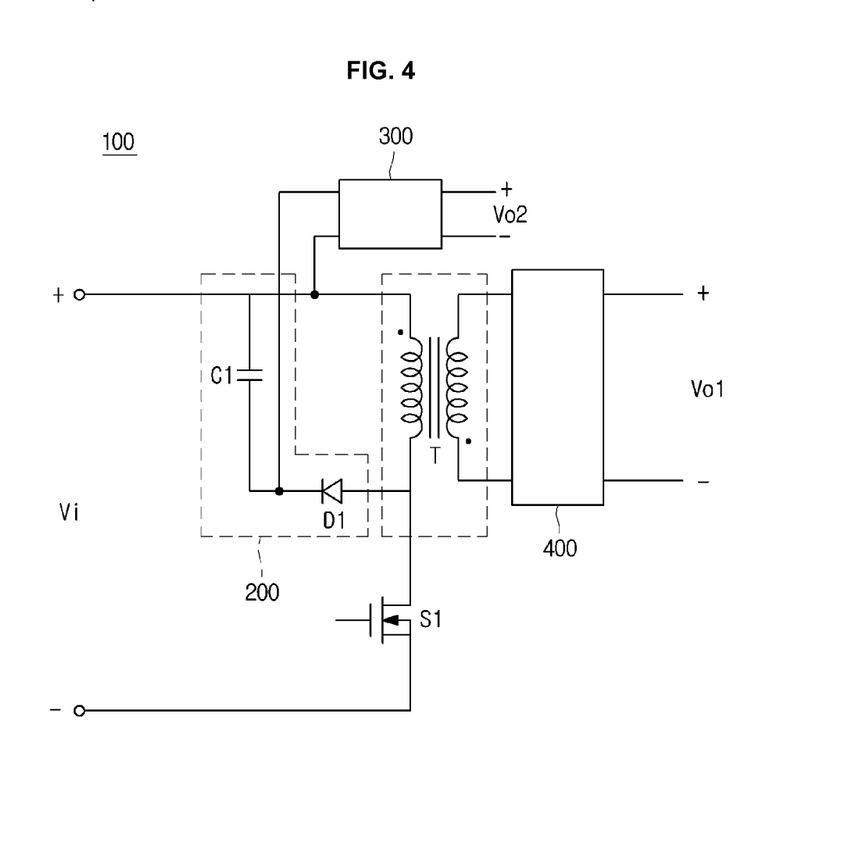
FIG. 4 is a circuit diagram showing a multiple-output DC/DC converter according to an embodiment.

FIG. 4 is a circuit diagram showing a multiple-output DC/DC converter according to an embodiment.

Referring to FIG. 4, a multiple-output DC/DC converter 100 according to an embodiment may include a transformer T, a surge absorbing module or circuit 200, an energy converting module or circuit 300, an output module or circuit 400 and a switch S1. The surge absorbing module 200 may be connected to a primary port of the transformer T having the turn ratio of n. The energy converting module 300 may be connected to the surge absorbing module 200, and one terminal of the switch S1 may be connected to one terminal of the primary side of the transformer T.

The surge absorbing module 200 may include a capacitor C1 and a diode D1 connected in series to each other. In detail, the anode of the diode D1 may be connected to the transformer T and the cathode of the diode D1 may be connected to the capacitor C1. One terminal of the capacitor C1 may be connected to the cathode of the diode D1 and the other terminal of the capacitor C1 may be connected to the transformer T.

The energy converting module 300 may be connected to both terminals of the capacitor C1 of the surge absorbing module 200. That is, the energy converting module 300 may be connected in parallel to the capacitor C1. An input voltage Vi may be applied between the other terminal of the primary side of the transformer T and the other terminal of the switch S1. The input voltage Vi may be DC (direct current) power, that is, a direct current power rectified by allowing AC power to pass through a rectifier (not shown) and a filter.

The secondary port of the transformer T may be connected to an output module 400. Although the output module 400 is configured to be operated like a buck-type forward converter, but the output module 400, the output module 400 may be configured to be operated like the buck-boost type flyback converter (which will be described in detail below).

The switch S1 may include an IGBT (Insulated Gate Bipolar Transistor) or an MOSFET, but the embodiment is not limited thereto and any circuit devices may be used as the switch S1 if operated as a switch. In addition, as shown in the drawings, the switch S1 is an N-channel enhancement-type MOSFET, the drain of which is connected to the transformer T and the source of which is connected to one terminal of the input power source.

Hereinafter, the operation of the multiple-output DC/DC converter 100 will be described. The surge absorbing module 200 may absorb the energy stored in the leakage inductance of the transformer T. The capacitor C1 of the surge absorbing module 200 may absorb the energy stored in the leakage inductance of the transformer T and may supply the energy to the energy converting module 300. The energy converting module 300 may receive the energy stored in the capacitor C1 of the surge absorbing module 200 as input thereof and may convert the applied energy into a new output voltage.

The output module 400 may receive energy from the secondary side of the transformer T and may provide a suitable output according to a buck type or buck-boost type. Thus, the output module 400 according to the embodiment may output a first output and the energy converting module 300 may output a second output, so that a multiple-output is enabled.

As compared with the snubber circuit 21 of consuming the energy stored in the capacitor C through the resistor R according to the related art, the energy converting module 300 according to the embodiment generates the second output by using the energy stored in the surge absorbing module 200 so that energy efficiency may be increased.

First Embodiment

Figure 5:
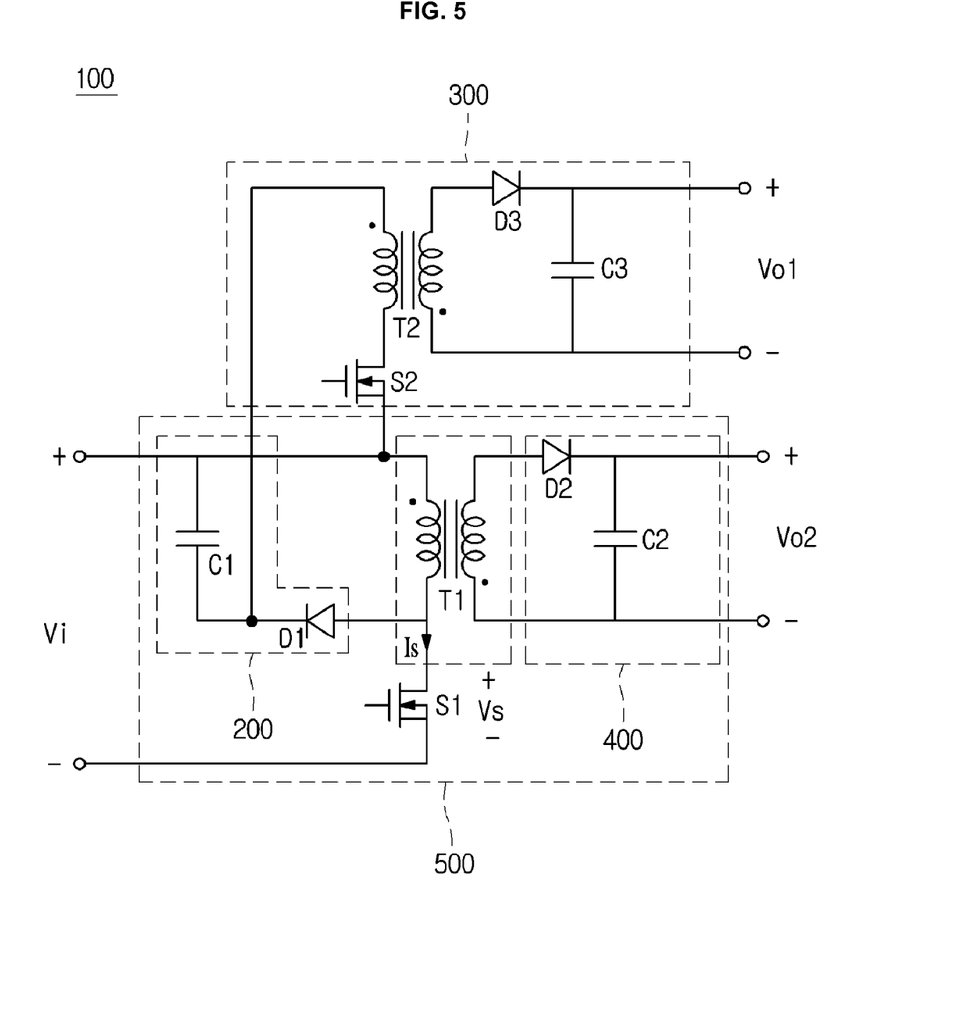
FIG. 5 is a circuit diagram showing a multiple-output DC/DC converter including a flyback converter according to a first embodiment.
Figure 6:
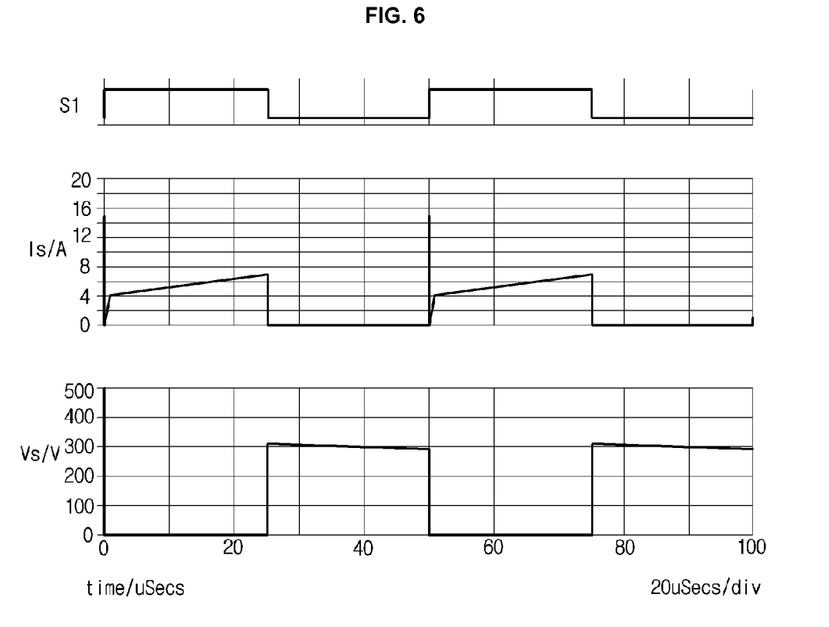
FIG. 6 is a waveform diagram illustrating a voltage applied to both terminals of a switch according to an operation of the switch according to the first embodiment.

FIG. 5 is a circuit diagram showing a multiple-output DC/DC converter including a flyback converter according to the first embodiment. FIG. 6 is a waveform diagram illustrating a voltage applied to both terminals of a switch according to an operation of the switch according to the first embodiment.

Referring to FIG. 5, the multiple-output DC/DC converter 100 according to the first embodiment may include a flyback converter 500. The flyback converter 500 may operate as an amplifier of obtaining a high output voltage with a few number of circuit devices, may achieve a system circuit insulation through a transformer, and may perform a voltage amplification in proportional to a turn ratio.

The multiple-output DC/DC converter 100 implemented with a flyback converter having first and second flyback converters 500 and 300. The first flyback converter 500 may include a first transformer T1 for generating a second output voltage Vo2, a surge absorbing module 200 including a first capacitor C1 and a first diode D1, and an output module 400 connected to the secondary side of the first transformer T1. The second flyback converter 300, which serves as an energy converting module (reference numeral 300 of FIG. 3) connected to the surge absorbing module 200 of the first flyback converter 500, may perform the same function as that of the first flyback converter.

Although, as voltage boosting converters, the first and second flyback converters 500 and 300 may perform the same function, there is a difference between the first and second flyback converters 500 and 300 because the first flyback converter 500 uses the input power Vi as the energy source and the second flyback converter 300 uses the energy of the surge absorbing module 200 as the energy source.

In addition, the first and second flyback converters 500 and 300 includes first and second switches S1 and S2, respectively, and may be controlled by a single controller or mutually different controllers.

The above-described controller may include a PWM control module and a gate driving module. When the first and second switches S1 and S2 are MOSFETs, the controller described above may provide a control signal to the gates. When the first and second switches S1 and S2 are switched on, voltages may be induced to the secondary windings of the first and second transformers T1 and T2, the polarities of which are opposite to those of the voltages applied to the primary windings of the first and second transformers T1 and T2.

The voltage having the polarity opposite to that of the input voltage Vi may be induced to the secondary winding of the first transformer T1, and the voltage having the polarity opposite to that of the voltage applied to both terminals of the capacitor C1 of the surge absorbing module 200 may be induced to the secondary winding of the second transformer T2.

Since the voltages having the polarities opposite to those of the primary windings of the first and second transformers T1 and T2 are induced to the secondary windings of the first and second transformers T1 and T2, the second and third diodes D2 and D3 of the first and second flyback converters 500 and 300 are reverse biased to be open circuited, so that any currents do not flow through the secondary winds of the first and second flyback converters 500 and 300 and currents flow through only the primary winds of the first and second flyback converters 500 and 300. In addition, since currents flow through only the primary winds of the first and second flyback converters 500 and 300, energy is accumulated in the magnetizing inductance.

When the first and second switches are switched off, voltages are induced to the secondary windings of the first and second transformers T1 and T2, the polarities of which are opposite to those in the previous states of the secondary windings of the first and second transformers T1 and T2. Thus, the second and third diodes are turned on, so that the energy accumulated in the magnetizing inductances of the first and second transformers T1 and T2 is provided to the load.

When the first and second switches are switched off, since the energy accumulated in the leakage inductance operates as a surge voltage, the surge voltage allows the first diode D1 of the surge absorbing module 200 to be turned on, so that the first capacitor C1 is charged with the energy stored in the leakage inductance through the first diode D1.

Then, when the first and second switches S1 and S2 are switched on again, energy is charged in the magnetizing inductance and the energy of the first capacitor C1 of the surge absorbing module 300 is used as input power of the second flyback converter 300.

Referring to FIG. 6, as the above-described operation is repeated, since the energy stored in the leakage inductance is absorbed by the surge absorbing module 200 as soon as the first switch S1 of the first flyback converter 500 is turned off as shown in FIG. 6, a spark-type voltage surging into both terminals of the first switch S1 may be reduced, and at the same time, the energy stored in the surge absorbing module 200 may be used as an energy source for operating the second flyback converter 300.

When the energy stored in the first capacitor C1 is supplied to the energy converting module 300, a transferring speed of energy may vary with a value of resistance viewed from the first capacitor C1 to the energy converting module 300. When the resistance viewed to the energy converting module 300 is great, the energy stored in the first capacitor C1 may be rapidly discharged. Since a degree of absorbing a surge voltage may vary with capacitance of the first capacitor C1, the amplitude of a spark type voltage applied to the first switch S1 may be controlled to be equal to or less than a breakdown voltage of the first switch S1 by controlling the capacitance of the first capacitor C1.

The output of the first flyback converter 500 is n1*Vi/(1−D1), the output of the second flyback converter 300 is n2*Vc/(1−D2), and the voltage between both terminals of the first flyback converter 500 is Vin(1−D1)+nV0, where n1 is a turn ratio of the first transformer T1, n2 is a turn ratio of the second transformer T2, D1 is a duty ratio of the first flyback converter 500, and D2 is a duty ratio of the second flyback converter 300. D1 and D2 may be a PWM signal provided from a single PWM control module or mutually different PWM signal provided from mutually different PWM control modules.

Second Embodiment

Figure 7:
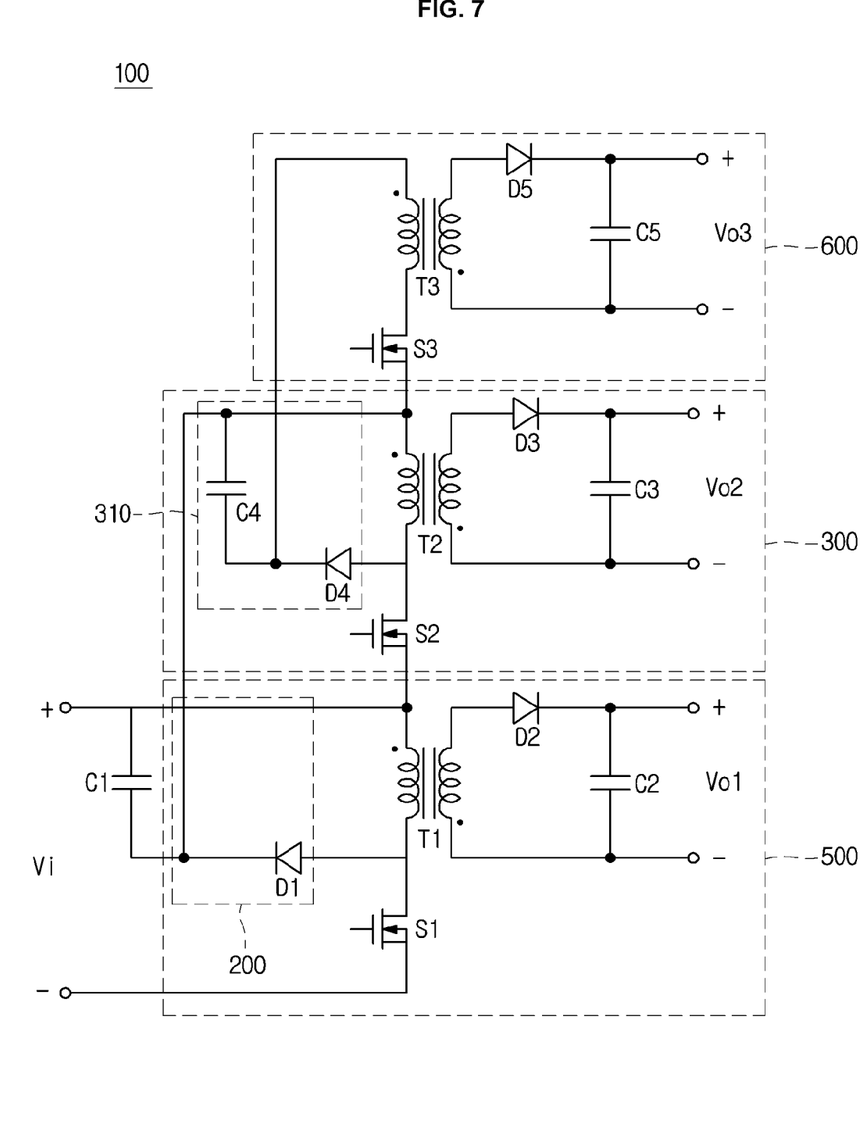
FIG. 7 is a circuit diagram showing a multiple-output DC/DC converter according to a second embodiment.

FIG. 7 is a circuit diagram showing a multiple-output DC/DC converter according to a second embodiment. The multiple-output DC/DC converter includes first to third flyback converters 500, 300 and 600. Differently from the first embodiment, the second flyback converter 300 includes a second surge absorbing module or circuit 310, and the multiple-output DC/DC converter according to the second embodiment includes the third flyback converter 600 which uses the energy of the second surge absorbing module 310 of the second flyback converter 300 as input power.

The energy stored in the leakage inductance of the first flyback converter 500 may be stored in the first capacitor C1 of the first surge absorbing module 200 and the energy stored in the first capacitor C1 may be provided to the second flyback converter 300 as the input power. In addition, the energy stored in the leakage inductance of the second flyback converter 300 may be stored in the fourth capacitor C4 of the second surge absorbing module 310 and the energy stored in the fourth capacitor C4 may be provided to the third flyback converter 600 as the input power.

The first to third switches S1, S2 and S3 of the first to third flyback converters 500, 300 and 600 may be simultaneously controlled by a single controller, or may be controlled by separated controllers, respectively.

In the drawings, although the third flyback converter 600 does not include surge absorbing modules, the third flyback converter 600 may include a separated surge absorbing module or circuit like the first and second surge absorbing modules or circuits 200 and 310. In this case, a separated DC/DC converter may be connected to the surge absorbing module included in the third flyback converter as the first and second flyback converter 500 and 300.

According to the multiple-output DC/DC converter 100 according to the second embodiment, the first and second switches S1 and S2 may be protected by absorbing the surge voltages of the first and second flyback converters 500 and 300 and in addition, the energy of the first and second surge absorbing modules 200 and 310 may be used for another flyback converter, so that the power efficiency may be improved.

In addition, the outputs of the first to third flyback converters 500, 300 and 600 may be provided to a single load or mutually different loads. That is, in an apparatus requiring various power sources, the outputs of the first to third flyback converter 500, 300 and 600 may be connected to corresponding apparatuses.

Third Embodiment

Figure 8:
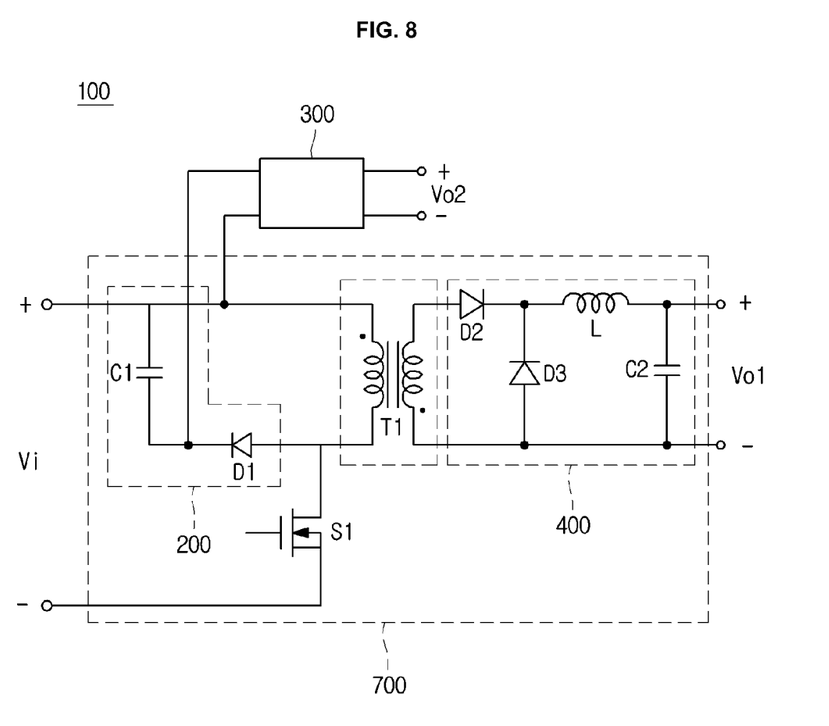
FIG. 8 is a circuit diagram showing a multiple-output DC/DC converter according to a third embodiment.

FIG. 8 is a circuit diagram showing a multiple-output DC/DC converter according to a third embodiment. The multiple-output DC/DC converter 100 according to the third embodiment may include a transformer T, a surge absorbing module or circuit 200, an energy converting module or circuit 300, an output module or circuit 400 and a switch S1. The multiple-output DC/DC converter 100 according to the third embodiment, which includes a forward converter 700 including a surge absorbing module 200 and an energy converting module 300, may generate a first output Vo1 from the forward converter 700 and a second output Vo2 from the energy converting module 300.

In the third embodiment, an output module different from the first and second embodiments will be mainly described. The output module 400 may include second and third diodes D2 and D3 having the cathodes connected to each other and the anodes connected to the secondary side of the transformer T1, respectively, an inductor L connected between the cathodes of the second and third diodes D2 and D3 and a second capacitor C2, and the second capacitor C2 connected between the anode of the third diode D3 and the inductor L.

The operation of the multiple-output DC/DC converter 100 according to the third embodiment will be described. When the first switch S1 is switched on, energy is accumulated in the leakage inductance of the primary side, the second diode D2 of the output module is turned on and the third diode D3 is turned off, so that the current of the input side is transferred to the output side through the transformer T1 and at the same time, energy is accumulated in the inductor L of the output module.

Next, when the first switch S1 is switched off, the second diode D2 is turned off and the third diode D3 is turned on, so that the energy accumulated in the inductor L is supplied to the output side. Since the energy accumulated in the leakage inductance operates on the switch S1 as a surge voltage, the surge voltage allows the first diode D1 of the surge absorbing module 200 to be turned on, so that the first capacitor C1 is charged with the energy stored in the leakage inductance through the first diode D1.

When the switch S1 is switched on, energy is charged in the leakage inductance and the energy of the first capacitor C1 of the surge absorbing module 200 is applied to the energy converting module 300 as input power. Since the energy stored in the leakage inductance is absorbed by the surge absorbing module 200 through repeating of the above-described operation immediately after the switch S1 of the forward converter 700 is switched off, a spark type voltage may be reduced at both terminals of the switch S1 and in addition, the energy stored in the surge absorbing module 200 may be used as an energy source for operating the energy converting module 300.

Meanwhile, the energy converting module 300 may include the forward converter or the flyback converter described in the first embodiment. Of course, a separated surge absorbing module (not shown) may be additionally provided to the energy converting module 300 itself. As described in the second embodiment, another energy converting module (reference numeral 600 in FIG. 7) may be additionally provided such that the multiple-output DC/DC converter of forming three output voltages is implemented.

Fourth Embodiment

Figure 9:
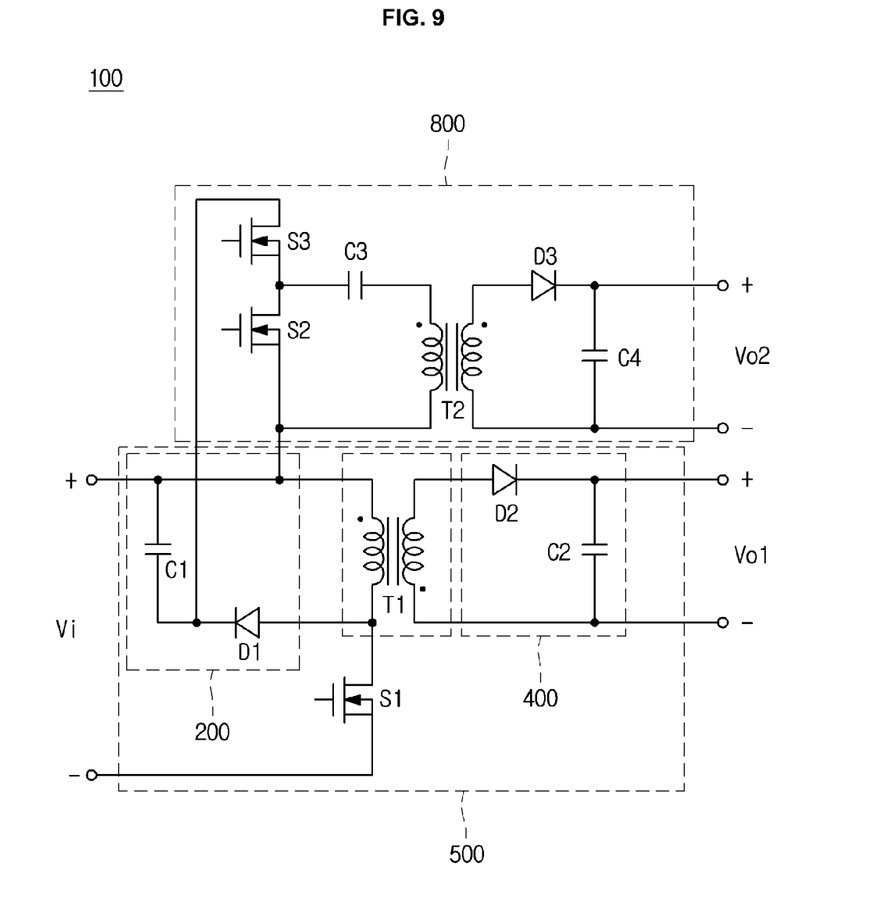
FIG. 9 is a circuit diagram showing a multiple-output DC/DC converter according to a fourth embodiment.

FIG. 9 is a circuit diagram showing a multiple-output DC/DC converter according to a fourth embodiment. The multiple-output DC/DC converter 100 according to the fourth embodiment may include a flyback converter 500 and an LLC resonance converter 800 (including two inductors and one capacitor) as an energy converting module or circuit. The flyback converter 500 may include a surge absorbing module or circuit 200, a first transformer T1, an output module or circuit 400 and a first switch S1.

In the LCC resonance converter 800, a series circuit including second and third switches S2 and S3 may connected to both terminals of a first capacitor C1 and one terminal of the primary side of a second transformer T2 may be connected to a connecting node between the second and third switches S2 and S3 through a third capacitor C3. The other terminal of the primary side of the second transformer T2 may be connected to the second switch S2. In addition, the secondary side of the second transformer T2 may be connected to a circuit including a third diode D3 and a fourth capacitor C4.

The LLC resonance converter 800 is connected to both terminals of the first capacitor C1 of the surge absorbing module 200, so that the energy stored in the first capacitor C1 of the surge absorbing module 300 may be used as input power. The LLC resonance converter 800, which is a converter of which power density and efficient property are enhanced, may have a high efficient property in all load ranges through a zero voltage switching (ZVS) operation of the second and third switching devices in the primary side and a zero current switching (ZCS) operation of the third diode D3 in the secondary side.

It is possible to construct the switching circuit without any additional snubber circuit, and the leakage inductance and the magnetizing inductance may be easily manufactured according to a transformer design. The operations of the first to third switches S1 to S3 may be also controlled by using a single controller or plural controllers.

In the LLC resonance converter 800, signals having mutually different phases may be provided to the second and third switches S2 and S3, respectively, and the energy, which is generated by using a resonance phenomenon occurring in the primary side of the second transformer T2 according to the operations of the second and third switches S2 and S3, may be transferred to the secondary side.

A spark type voltage which may be formed in the first switch S1 of the flyback converter 500 may be restricted and the spark type voltage may be absorbed by the surge absorbing module 200 to be used as an energy source of the LLC resonance converter 800, so that the first switch S1 may be prevented from being destroyed due to the surge voltage and energy efficiency may be maximized.

In the fourth embodiment, the flyback converter 500 has been described above as a converter of generating the first output voltage Vo1, but this is merely one example and flyback converter may be replaced with a forward converter.

Fifth Embodiment

Figure 10:
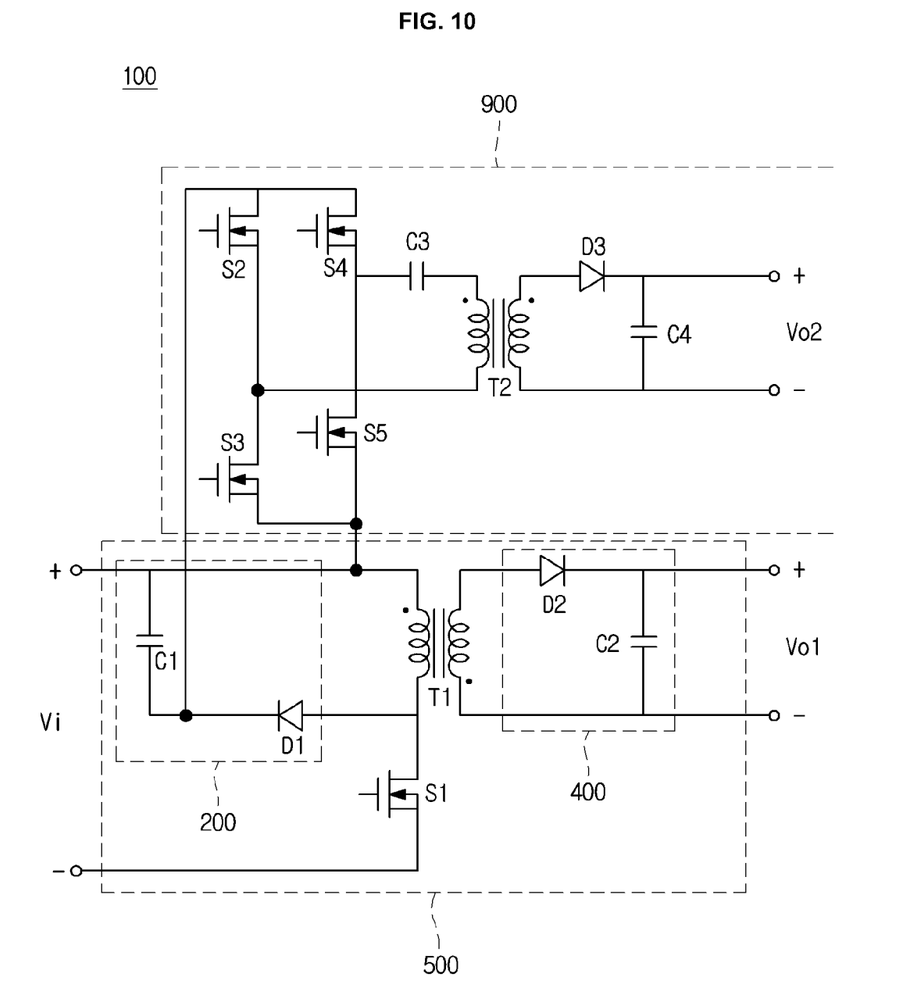
FIG. 10 is a circuit diagram showing a multiple-output DC/DC converter according to a fifth embodiment.

FIG. 10 is a circuit diagram showing a multiple-output DC/DC converter according to a fifth embodiment. A multiple-output DC/DC converter 100 may include a flyback converter 500 and a full-bridge converter 900 as an energy converting module or circuit. A series circuit including second and third switches S2 and S3 and a series circuit including fourth and fifth switches S4 and S5 of the full-bridge converter 900 are connected to both terminals of a first capacitor C1.

One terminal of the primary side of a second transformer T2 of the full-bridge converter 900 may be connected to a connecting node between the second and third switches S2 and S3 through a third transistor C3, and the other terminal may be connected to a connecting node between the fourth and fifth switches S4 and S5. The first to fifth switches S1 to S5 may be controlled by using a single controller or plural controllers. A secondary side may be connected to a circuit including a third diode D3 and a fourth capacitor C2.

The full-bridge convert, which is a circuit capable of performing ZVS and ZCS, is connected to the first capacitor C1 of the surge absorbing module 200, so that the energy stored in the first capacitor C1 may be used as input power.

The surge absorbing module 200 may restrict the surge voltage which may be formed in the first switch S1 of the flyback converter 500 and the surge voltage absorbed by the surge absorbing module 200 may be used as input power of the full-bridge converter 900, so that the first switch S1 is prevented from being destroyed due to the surge voltage and the energy efficiency is maximized.

In the fifth embodiment, the flyback converter 500 has been described above as one example, but this may be a multiple-output DC/DC converter including a forward converter of generating a first output voltage Vo1 and a full-bridge of generating a second output voltage Vo2 as an energy converting module.

Sixth Embodiment

Figure 11:
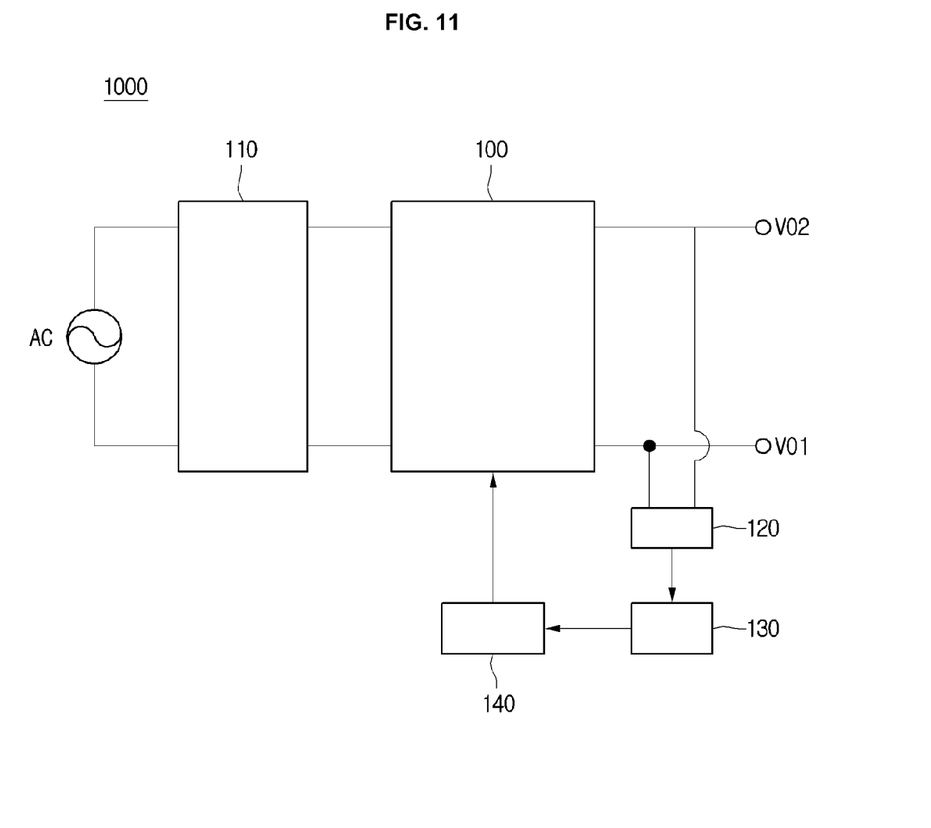
FIGS. 11 and 12 is a circuit diagram showing a power supply including a multiple-output DC/DC converter according to a sixth embodiment.
Figure 12:
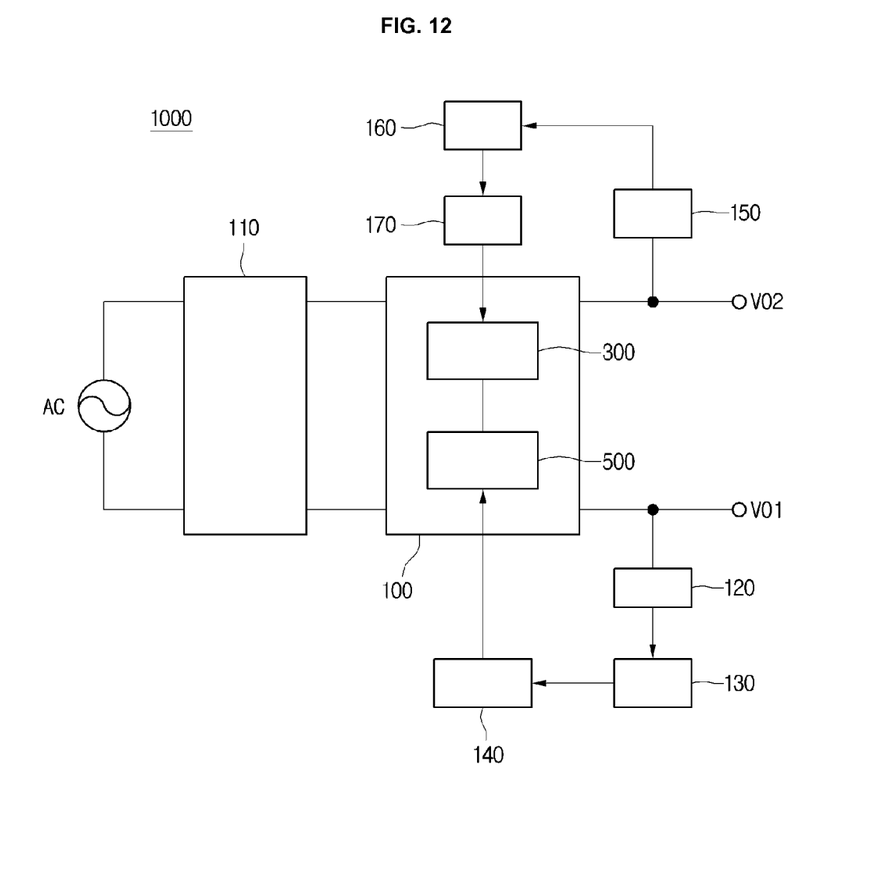

FIGS. 11 and 12 is a circuit diagram showing a power supply including a multiple-output DC/DC converter according to a sixth embodiment. The power supply 100 including the multiple-output DC/DC converter according to the sixth embodiment may include a rectifier 110, the multiple-output DC/DC converter 100, a voltage-current sensing module or circuit 120, a PWM control module or circuit 130 and a driving control module or circuit 140. As described in the first to fifth embodiment, the multiple-output DC/DC converter 100 may include a converter for outputting a first output voltage Vo1 and an energy converting module for outputting a second output voltage Vo2 based on a surge voltage of the converter as an energy source.

The rectifier 110 rectifies AC power input thereto and outputs DC power to the multiple-output DC/DC converter 100. Then, the multiple-output DC/DC converter 100 may provide a plurality of output voltages Vo1 and Vo2. The voltage-current sensing module 120 may sense at least one of the voltage and the current from the multiple-output DC/DC converter 100 to provide the sensing result to the PWM control module 130. Then, the PWM control module 130 may provide a PWM signal to the driving control module 140. The driving control module 140 may control an operation of a switching device in the multiple-output DC/DC converter 100 according to a PWM duty ratio of the PWM control module 130.

Referring to FIG. 12, as shown in FIG. 11, the multiple-output DC/DC converter 100 may be controlled by using a single voltage-current sensing module or circuit 120, a PWM control module or circuit 130 and a driving control module or circuit 140. Differently from the above, the voltage-current sensing module 120, the PWM control module 130 and the driving control module 140 may control a switch device of the converter 500 outputting the first output voltage Vo1 in the multiple-output DC/DC converter 100, and a second current sensing module 150, a second PWM control module 160 and a second driving control module 170 may control a switch device of the energy converting module 300 outputting the second output voltage Vo2 in the multiple-output DC/DC converter 100. Thus, the converter 500 and the energy converting module 300 are individually controlled so that the desired first and second output voltages Vo1 and Vo2 may be obtained.

As described above, the outputs of the energy converting modules of the first to fifth embodiments may be connected together to a load connected to the output module 400 of FIG. 4 or connected alone to the load, to be used as a supplementary power source. Thus, a fault phenomenon of a switch device may be prevented from occurring, and energy based on a surge voltage may be used as a separated power source so that power efficiency is improved.

The multiple-output DC/DC converter 100 according to the embodiment may be used for a small size battery, an electric vehicle (EV), or an electric storage system (ESS), and may be also applied to a power supply of LED. When there is a need to supply not a battery voltage but a DC voltage to an inner circuit of a portable electronic appliance which operates with electric power from a battery serving as a power source, the DC/DC converter according to the embodiment may be used. In addition, even in case of supplying a plurality of DC power in a system, the multiple-output DC/DC converter according to the embodiment may be used.

The embodiment provides a multiple-output DC/DC converter which is capable of restricting a surge voltage of a switch device by using a DC/DC converter having a surge absorbing module and a power supply having the same.

In addition, the embodiment provides a multiple-output DC/DC converter which includes an energy converting module for converting energy stored in a surge absorbing module to provide a multiple-output so that power efficiency is improved, and a power supply having the same.

According to an embodiment, there is provided a multiple-output DC/DC converter including: a converter including a transformer and a first surge absorbing module, wherein the transformer includes a first switch provided to a primary side and outputs a first voltage to a secondary side, and the first surge absorbing module is connected to the primary side of the transformer and absorbs a surge voltage formed at the first switch by a leakage inductance of the transformer; and a first energy converting module to receive output energy supplied from the first surge absorbing module and output a second voltage.

The converter is one of a flyback converter and a forward converter.

The first energy converting module is one of a flyback converter, an LLC resonance converter (including two inductors and one capacitor) and a full-bridge converter.

The first surge absorbing module includes a first capacitor connected to the primary side of the transformer and a first diode, and the first energy converting module has a voltage between both terminals of the first capacitor as an input voltage.

The converter is a flyback converter, and a second diode and a second capacitor are connected to the secondary side of the transformer.

The converter is a first flyback converter and the first energy converting module is a second flyback converter, wherein a first voltage of the first flyback converter is $n1*Vi/(1-D1)$ and an output of the second flyback converter is $n2*Vc/(1-D2)$, n1 is a turn ratio of a transformer of the first flyback converter, Vi is an input power, D1 is a duty ratio of a first PWM signal for driving the first switch, and N2 is a turn ratio of a transformer of the second flyback converter, Vc is a voltage between both terminals of the first capacitor, and D2 is a duty ratio of a second PWM signal for driving the second switch of the second flyback converter.

The first PWM signal is equal to the second PWM signal.

The first and second switches are N-channel enhancement-type MOSFETs.

The first energy converting module includes a second surge absorbing module.

The multiple-output DC/DC converter further includes a second energy converting module connected to the second surge absorbing module to output a third voltage based on energy stored in the second surge absorbing module as input power.

According to another embodiment, there is a power supply which includes a converter including a transformer and a surge absorbing module, wherein the transformer includes a switch provided to a primary side and outputs a first voltage to a secondary side, and the surge absorbing module is connected to the primary side of the transformer and absorbs a surge voltage formed at the switch by a leakage inductance of the transformer, and a energy converting module to receive output energy supplied from the surge absorbing module and output a second voltage; a rectifier to rectify AC power to provide DC power to the multiple-output DC/DC converter; a sensing module to sense an output of the multiple-output DC/DC converter; and a PWM control module and a driving control module to control the first and second voltages.

The sensing module includes first and second sensing modules, the PWM control module includes first and second PWM control modules, the driving control module includes first and second driving control modules, the first sensing module, the first PWM control module and the first driving control module control the converter, and the second sensing module, the second PWM control module and the second driving control module control the energy converting module.

The embodiment provides the multiple-output DC/DC converter which includes the surge voltage absorbing module and the energy converting module to operate the switch device in the stable range and is capable of improving the power efficiency by using the energy of on the surge voltage as an energy source of another converter, and the power supply having the same.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multiple-output DC/DC converter comprising:
a converter including a transformer and a first surge absorbing circuit, wherein the transformer includes a first switch provided to a primary side and outputs a first voltage to a secondary side, and the first surge absorbing circuit is connected to the primary side of the transformer and absorbs a surge voltage formed at the first switch by a leakage inductance of the transformer; and
a first energy converting circuit to receive output energy supplied from the first surge absorbing circuit and to output a second voltage,
wherein the first surge absorbing circuit includes a first capacitor connected to the primary side of the transformer and a first diode,
wherein the first energy converting circuit has a voltage between both terminals of the first capacitor as an input voltage,
wherein the converter is a first flyback converter, and the first energy converting circuit is a second flyback converter,
wherein a first voltage of the first flyback converter is $n1*Vi/(1-D1)$, and an output of the second flyback converter is $n2*Vc/(1-D2)$,
n1 is a turn ratio of a transformer of the first flyback converter, Vi is an input power, D1 is a duty ratio of a first PWM signal for driving the first switch, and
n2 is a turn ratio of a transformer of the second flyback converter, Vc is a voltage between both terminals of the first capacitor, and D2 is a duty ratio of a second PWM signal for driving a second switch of the second flyback converter.

2. The multiple-output DC/DC converter of claim 1, wherein a second diode and a second capacitor are connected to the secondary side of the transformer.

3. The multiple-output DC/DC converter of claim 1, wherein the first PWM signal is equal to the second PWM signal.

4. The multiple-output DC/DC converter of claim 3, wherein the first and second switches are N-channel enhancement-type MOSFETs.

5. A multiple-output DC/DC converter comprising:
a converter including a transformer and a first surge absorbing circuit, wherein the transformer includes a first switch provided to a primary side and outputs a first voltage to a secondary side, and the first surge absorbing circuit is connected to the primary side of the transformer and absorbs a surge voltage formed at the first switch by a leakage inductance of the transformer; and
a first energy converting circuit to receive output energy supplied from the first surge absorbing circuit and output a second voltage,
wherein the first energy converting circuit includes a second surge absorbing circuit; and a second energy converting circuit connected to the second surge absorbing circuit to output a third voltage based on energy stored in the second surge absorbing circuit as input power.

6. A power supply comprising:
a multiple-output DC/DC converter including a converter and an energy converting circuit, wherein the converter includes a transformer and a surge absorbing circuit, wherein the transformer includes a first switch provided to a primary side and outputs a first voltage to a secondary side, and the surge absorbing circuit is connected to the primary side of the transformer and absorbs a surge voltage formed at the first switch by a leakage inductance of the transformer, wherein the energy converting circuit to receive output energy supplied from the surge absorbing circuit and to output a second voltage;

a rectifier to rectify AC power to provide DC power to the multiple-output DC/DC converter;

a sensing circuit to sense an output of the multiple-output DC/DC converter; and a PWM control circuit and a driving control circuit to control the first and second voltages, wherein the surge absorbing circuit includes a first capacitor connected to the primary side of the transformer and a first diode, wherein the energy converting circuit has a voltage between both terminals of the first capacitor as an input voltage, wherein the converter is a first flyback converter, and the energy converting circuit is a second flyback converter, wherein a first voltage of the first flyback converter is $n1*Vi/(1-D1)$, and an output of the second flyback converter is $n2*Vc/(1-D2)$, n1 is a turn ratio of a transformer of the first flyback converter, Vi is an input power, D1 is a duty ratio of a first PWM signal for driving the first switch, and n2 is a turn ratio of a transformer of the second flyback converter, Vc is a voltage between both terminals of the first capacitor, and D2 is a duty ratio of a second PWM signal for driving a second switch of the second flyback converter.

7. The power supply of claim 6, wherein the sensing circuit includes first and second sensing modules, the PWM control circuit includes first and second PWM control modules, the driving control circuit includes first and second driving control modules, the first sensing circuit, the first PWM control circuit and the first driving control circuit control the converter, and the second sensing module, the second PWM control module and the second driving control module control the energy converting circuit.

* * * * *